United States Patent
Chron et al.

(10) Patent No.: US 6,952,758 B2
(45) Date of Patent: Oct. 4, 2005

(54) METHOD AND SYSTEM FOR PROVIDING CONSISTENT DATA MODIFICATION INFORMATION TO CLIENTS IN A STORAGE SYSTEM

(75) Inventors: Edward Gustav Chron, Santa Clara, CA (US); Jaishankar Moothedath Menon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 10/210,489

(22) Filed: Jul. 31, 2002

(65) Prior Publication Data

US 2004/0024973 A1 Feb. 5, 2004

(51) Int. Cl.[7] ............................................. G06F 12/00
(52) U.S. Cl. ..................... 711/162; 711/100; 711/112; 711/114; 711/156; 711/162; 711/200; 711/202; 707/100; 707/202; 707/203; 707/204; 707/205
(58) Field of Search ................. 711/100–103, 111–114, 711/154, 156, 161–162, 200, 202, 4, 6, 146, 208, 216; 707/100, 200–205; 714/4–6

(56) References Cited

U.S. PATENT DOCUMENTS

| 4,654,819 | A | | 3/1987 | Stiffler et al. |
| 5,051,887 | A | | 9/1991 | Berger et al. |
| 5,526,482 | A | * | 6/1996 | Stallmo et al. .................. 714/6 |
| 5,636,359 | A | * | 6/1997 | Beardsley et al. ........... 711/122 |
| 5,852,713 | A | | 12/1998 | Shannon |
| 5,996,088 | A | | 11/1999 | Frank et al. |
| 6,014,676 | A | | 1/2000 | McClain |
| 6,061,770 | A | * | 5/2000 | Franklin ....................... 711/62 |
| 6,148,383 | A | | 11/2000 | Micka et al. |
| 6,223,269 | B1 | | 4/2001 | Blumenau |
| 6,240,486 | B1 | | 5/2001 | Ofek et al. |
| 6,662,197 | B1 | * | 12/2003 | LeCrone et al. ............. 707/204 |
| 2003/0051111 | A1 | * | 3/2003 | Nakano et al. .............. 711/162 |

* cited by examiner

*Primary Examiner*—Donald Sparks
*Assistant Examiner*—Hashem Farrokh
(74) *Attorney, Agent, or Firm*—Khanh Q. Tran; Mark C. McCabe (57) ABSTRACT

A data storage system and method for providing consistent data to multiple clients based on data modification information as existing data is updated and new data is written to the system. The information indicates the modification status of each data block and identifies which data blocks have been modified during a certain time interval. The clients may query and update the modification information by submitting requests through a request processor. The data modification information includes an Altered Block Map that indicates block modification status and a Toggle Block Map that identifies which blocks have been modified. The system further includes a Modification Counter a Pending Reset Counter for improved recognition and handling of the modified data.

27 Claims, 6 Drawing Sheets

METHOD AND SYSTEM FOR PROVIDING CONSISTENT DATA MODIFICATION INFORMATION TO CLIENTS IN A STORAGE SYSTEM

TECHNICAL FIELD

This invention relates to computer storage systems, and more particularly to a storage system and method for providing consistent data modification information to users of the storage system based on data modification maps.

BACKGROUND OF THE INVENTION

Data information systems need to store and maintain data and use storage devices to hold data persistently. New data is introduced and existing data is modified regularly. Determining what information has been added to or modified on a storage device over a specific time interval is necessary for back-up and to provide redundancy for data stored on the storage device. Modification information can also be of interest to transactional systems that are concerned with ensuring that updated data was updated successfully on a storage device.

To ensure the availability and integrity of data, data is often backed up, archived or otherwise replicated. The back-ups, archives and replicates of information represent a set of critical functions required by many data information systems.

Data back-up is typically performed on a per file basis to allow individual files to be restored. Multiple versions of a file are usually stored by a back-up system, allowing access to older versions of a file. However, keeping multiple versions of data require substantially more storage space than the space occupied by the data being backed up. The need for more storage space, coupled with the fact that back-up data is typically not often referenced, encourages the use of lower cost storage media. If a file becomes corrupted at a point in time, it is possible that the file may be restored to a previous version to restore the file's integrity.

After taking an initial full file system back-up, a common method for back-up is to determine which files in the file system have been modified, by examining the file modification stamp to see if it has changed since the last back-up. If the file was modified, then the file data is copied. This method is referred to as incremental back-up. Incremental back-ups reduce the amount of data that is copied. The file system maintains the modification information and the file system interface can be used to determine which files have been modified. Also, since all the file data is copied, it is easy to collocate file data on the destination storage medium. This is advantageous for data being written to sequential media such as tape. A disadvantage to this method is that if only a portion of a file has been modified, the amount of data copied may be substantially more than what was modified.

An alternative method for data back-up is to determine what portions of a file have been modified and to copy only those portions that have been modified. One method to accomplish this is differential back-up. Differential back-up stores a compressed image of the file. Pieces of the compressed image can be compared against the file to determine if a portion of the file has been modified. Differential back-up has proven effective and is particularly useful for laptop computers or other computing devices that have limited bandwidth between the device and the destination storage medium. A disadvantage of this approach is that the host system has a compressed file image that requires resources to compress and to store the result. The host needs to examine the compressed image of modified files to determine what portions of the file have been modified. While an effective technology in environments where the rate of data modification is relatively low, it is less effective in environments where data modification occurs frequently or on a large amount of data or where host processor capacity is at a premium.

In addition to being backed up, data can be replicated to ensure that it is available from more than one source. Replication can be performed either dynamically or periodically. Dynamic replication ensures that replicated data is kept consistent at all times. Periodic replication ensures that data is guaranteed to be consistent only at specified times. At other times the device holding the data to be replicated and the devices that hold copies of that data may not be fully consistent.

Mirroring is an example of dynamic data replication. A storage device has its contents "mirrored" by one or more other storage devices forming a mirror set. Updates that occur will be applied simultaneously to each of the mirror set storage devices, keeping each device's data consistent with the other members of the mirror set. Mirroring can also be used to make data more widely available by making it simultaneously accessible from more than one device. Mirroring ensures that in the event of a device failure that device's current data remains available. However, mirroring can increase the latency of updates. The provider of the mirroring service must also have a mechanism to handle failure events to ensure that the mirrored devices remain coherent. Maintaining consistency between members of a mirrored set of devices needs to occur even during peak workloads, when resources are constrained. In addition, mirroring cannot be used in place of back-up. A back-up is still needed for recovering previous versions of a file or to recover a file if its is inadvertently deleted.

Replication can also be performed on a periodic or delayed basis. Periodic replication does not provide instant access to data in the event of a device failure. Such an approach does not provide a mirror set that is coherent except for those times when replication is performed. Data archival is an example of delayed replication. The contents of an archive are a replica of the data at some point in time, but changes occurring after the archive was made are not reflected. Data archival takes a copy of data off-line. Archived data can be combined with incremental back-ups to apply modifications to archived data. Data archival is an expensive process, in that typically all the data from a storage device is copied with each archival.

Various methods have been employed to determine what data on a storage device has been added or modified over some period of time because copying more data than is necessary for back-up, archival or replication purposes is undesirable. These methods typically are external to the storage device itself, often on a host system that owns the storage device or on a host adapter to which the storage device is attached. Host systems typically store data modification information in the form of a modification time stamp associated with each file within a file system. Storing and managing modification information on a host system are not an efficient use of the host's computing resources and result in poorer overall performance.

A file system could be implemented to track modifications on a per block basis. It might accomplish this by storing modification information about each block in the meta-data that the system keeps about each file. However, it would be difficult to ensure that file data and meta-data about the file are consistent with respect to one another in the event of a system failure. Any host system on which such a file system would exist would incur the additional overhead of such a facility.

Regardless of the method selected, it is desirable to reduce the overhead associated with determining what information has been added to or modified on the storage device. The need is exacerbated as storage devices increase in storage capacity and as more data needs to be processed.

Therefore, there remains a need for a method and storage system that can efficiently provide consistent data modification information to the clients without the drawbacks described above.

SUMMARY OF THE INVENTION

It is an object of the present invention to provide a storage system and method for presenting consistent data to multiple clients as the data is regularly updated to assure data integrity.

It is another object of the invention to provide consistent data to the clients based on data modification maps that indicate the modification status of data blocks and identify data blocks that were modified.

It is still another object of the invention to provide consistent data to the clients using bit maps as the data modification maps in which the bits respectively represent the modification status of the data blocks.

It is a further object of the invention to improve the recognition of modified data blocks using a Modification Counter and a Pending Reset Counter.

To achieve these and other objects, the present invention provides a storage system that includes a storage device for storing data and data modification information, a request processor for handling requests for data from the clients, and operations to provide consistent data. The request processor is capable of identifying data that has been modified during a given time interval based on the modification information and updating the modification information to ensure that the data accessed by the clients will be consistent. Preferably, data is stored on the device as data blocks and the data modification information includes an Altered Block Map and a Toggle Block Map. The Altered Block Map indicates the respective modification status of the data blocks while the Toggle Block Map identifies which data blocks have been modified over time. The Toggle Block Map is a bit map in which each bit corresponds to a data block and is complemented whenever the data block is modified. The Altered Block Map is also a bit map in which each pair of bits corresponds to a data block and includes a Modification Bit and a Pending Reset Bit. The Modification Bit is set whenever the data block is modified by a WRITE request. The Pending Reset Bit is set whenever the data block is requested by a client. The Modification Bit and the Pending Reset Bit may be reset by a request from a client to the request processor. If the data block is further modified after the respective Pending Reset Bit has been set, then the Pending Reset Bit is reset while the Modification Bit remains set.

The system of the invention further includes an Altered Block Counter for indicating the number of data blocks that have been modified and a Modification Counter for indicating whether data has been modified over a period of time. The Altered Block Counter is incremented whenever one of the data blocks is modified. If the Modification Bit is reset while the Pending Reset Bit is still on, then the Altered Block Counter is decremented and the Pending Reset Bit is reset. The Modification Counter is incremented each time one of the data blocks is committed to persistent storage as a result of a client request.

The present invention allows clients to access the desired data blocks and update the modification information through a set of application programs that submit requests to the request processor. The invention minimizes the overhead associated with various forms of data replication by distributing the mechanism to store and maintain the data modification information to the storage device. It facilitates rapid data replication and can also be used to perform incremental back-up and periodic data archival. When replication is performed, the replica can be used as the data source to perform back-up and archival operations, eliminating the need to access the device that was replicated. Additionally, the storage device of the invention can store coherent data modification information for use by a transactional facility such as a database. This information can be examined to ensure that data written to the storage device was actually committed.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENTS

The invention will be described primarily as a system and method for providing data consistency in a data storage system using a request processor and data modification information. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the operations of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Figure 1:
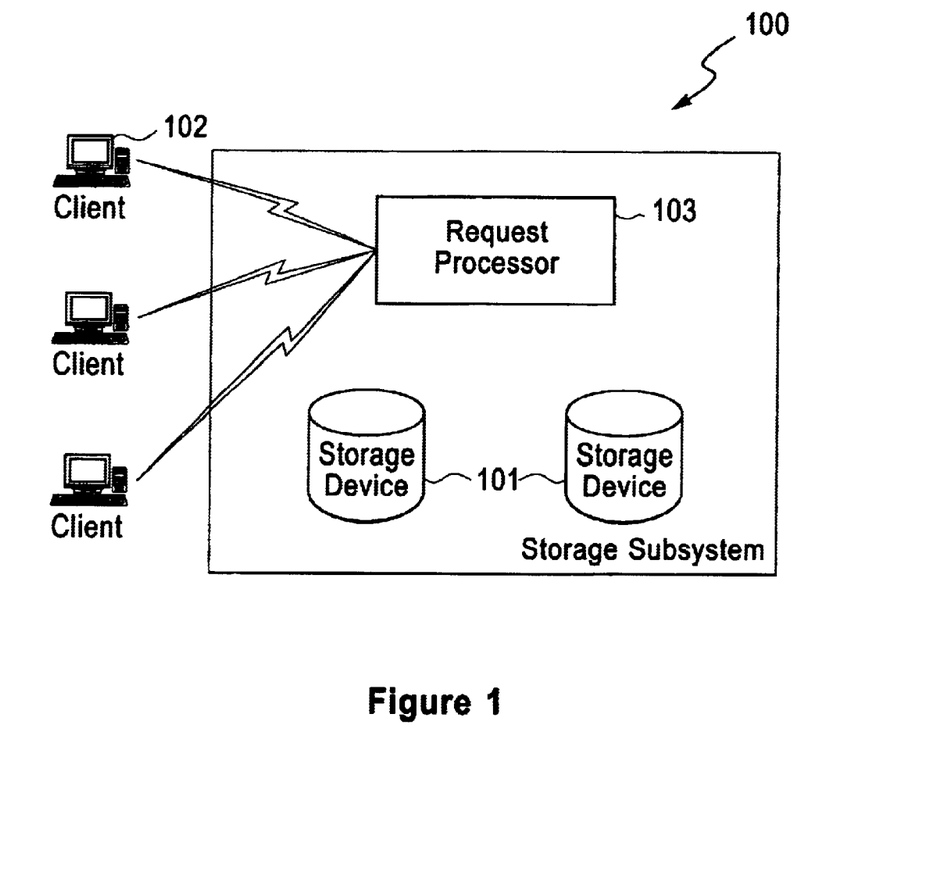
FIG. 1 is a schematic diagram showing the data storage system of the invention.

FIG. 1 illustrates a storage system 100 configured to perform the operations of the invention. The storage system 100 includes a request processor 103 and one or more storage devices 101. Each device 101 may include one or more hard disk drives, optical disks, tape drives or other types of data storage medium. Data is typically stored in the storage devices 104 as data blocks (or data sectors). All of the blocks on a storage device 101 are the same size; however, the actual value of the block size does not depend on the device. For some devices, the block size may be chosen from a list of the block sizes supported by the devices. In addition to the data accessed by the clients, the storage devices 104 also contain data modification information needed for the operations of the invention, as described in detail below in reference to FIGS. 2–6.

In accordance with the invention, multiple clients 102 can store and retrieve data to and from the storage devices 104 through a request processor 103. The clients 102 accomplish these tasks by submitting data requests to the request processor 103. There are five general types of client requests: READ, WRITE, READ MODIFIED BLOCKS, ACKNOWLEDGE MODIFIED BLOCKS, and OBTAIN TOGGLE MAP STATE.

READ requests allow the clients 102 to obtain contents of the requested data blocks that are stored on the storage devices 104. As READ requests do not alter the state of data or modification information, they are not discussed further. WRITE requests update one or more data blocks with data supplied by the client requests. When a WRITE request "commits" the modified data, the data update becomes persistent. That is, the modified data blocks are stored to a persistent storage device 101 and the modification information for those modified blocks must be updated and kept in persistent storage. The READ MODIFIED BLOCKS request allows a client to obtain the location and contents of one or more modified data blocks. The ACKNOWLEDGE MODIFIED BLOCKS request provides a mechanism to let the client acknowledge that it successfully received the modified blocks returned to it as a result of a previous read modified block request. The OBTAIN TOGGLE MAP STATE request allows a client to obtain the toggle map value for one or more specified blocks.

The modification information on the storage devices 104 allows the clients 102 to recognize when data blocks have been modified and to quickly determine which blocks have been modified. In the preferred embodiment of the invention, the modification information is stored together with client data on the same storage device 101, however, it can be also maintained in another persistent storage such as a battery-backed-up RAM or a separate storage device 101.

Figure 2:
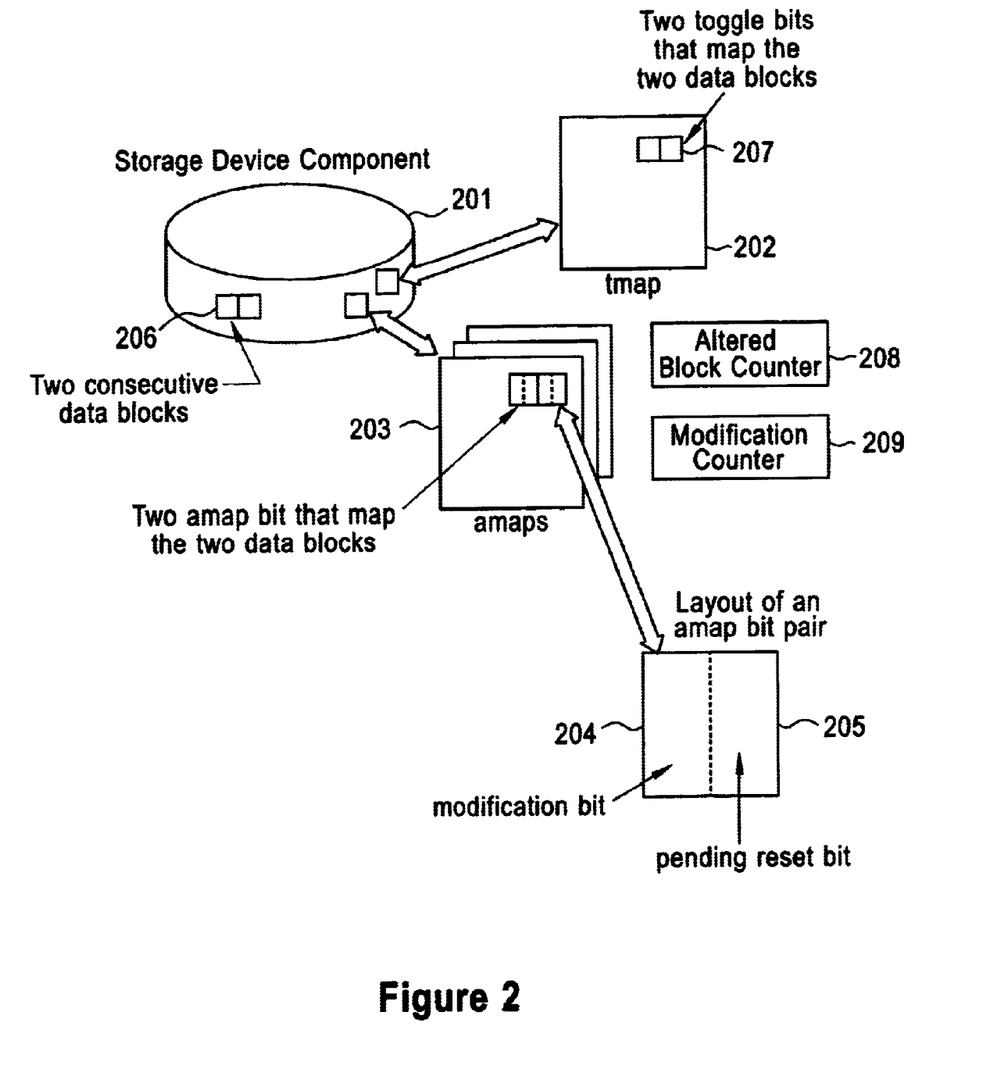
FIG. 2 illustrates the modification maps for two consecutive data blocks in a storage device component in accordance with the invention.

FIGS. 2 depicts a preferred embodiment of the facilities within a storage device 201 to support the operations of the invention. To allow the clients 102 to quickly recognize which blocks of data have been modified, a group of data modification maps are maintained on the storage device 201. There are two types of data modification maps: Toggle Block Maps (Tmaps) 202 and Altered Block Maps (Amaps) 203. While both types of maps maintain the data modification information, their contents and functions differ as described below.

The storage device 201 allows multiple copies of either or both types of the block modification maps to be defined. The number of modification maps for each map type on a device is determined when the administrator initializes the storage device. The clients 102, specifically the administrator, can control the modification information in several ways. The administrator can select the block size supported by the storage device and define the number and types of block modification maps for the storage device. The administrator can also control the use of the modification maps by suspending and resuming the monitoring of the data block modification information by the device.

In addition to the modification maps, a very small portion of storage space on the device 201 is used to store control information and system metadata. This data include configuration information such as the selected device block size, the number and types of the modification maps and the name of each map, and any other data needed by the storage device to correctly function and to interface with clients. The amount of storage space needed for the modification information, control information and system metadata depends on the format of the modification data.

A client 102 can send requests to the request processor 103 to query, update or control the monitoring of modification information for the storage device as described in detail below in reference to FIGS. 3–6. It can query a variety of information such as the number and types of modification maps, information about modification maps such as their assigned names, how large they are, the size of the storage device and the supported device block sizes and the block size selected, information about which blocks have been modified. A client 102 can update modification information by initiating a reset of selected block modification information under control of the storage device.

Although the modification maps 202 and 203 might be implemented in various forms, they will be described as bit maps to simplify the description of the invention. Other implementations may provide the block modification information based on the block numbers of the modified blocks that are stored in a readily accessible data structure such as a tree or a hashed queue. The preferred data modification map is an array of bits that store values representing the modification status for each of the data blocks on the storage device.

FIG. 2 illustrates a Tmap 202 and an Amap 203 which reside respectively in two consecutive data blocks 206 on the storage device 201. The Tmap 202 preferably includes a bit array with one Toggle Bit 207 allocated for each block 206 of storage that may be assigned to hold client data. Whenever a block 206 is modified by a write, the Toggle Bit 207 associated with that block is complemented. The operations for processing a possible update to a block mapped by the Tmap 202 are described below in reference to FIG. 3.

Figure 4:
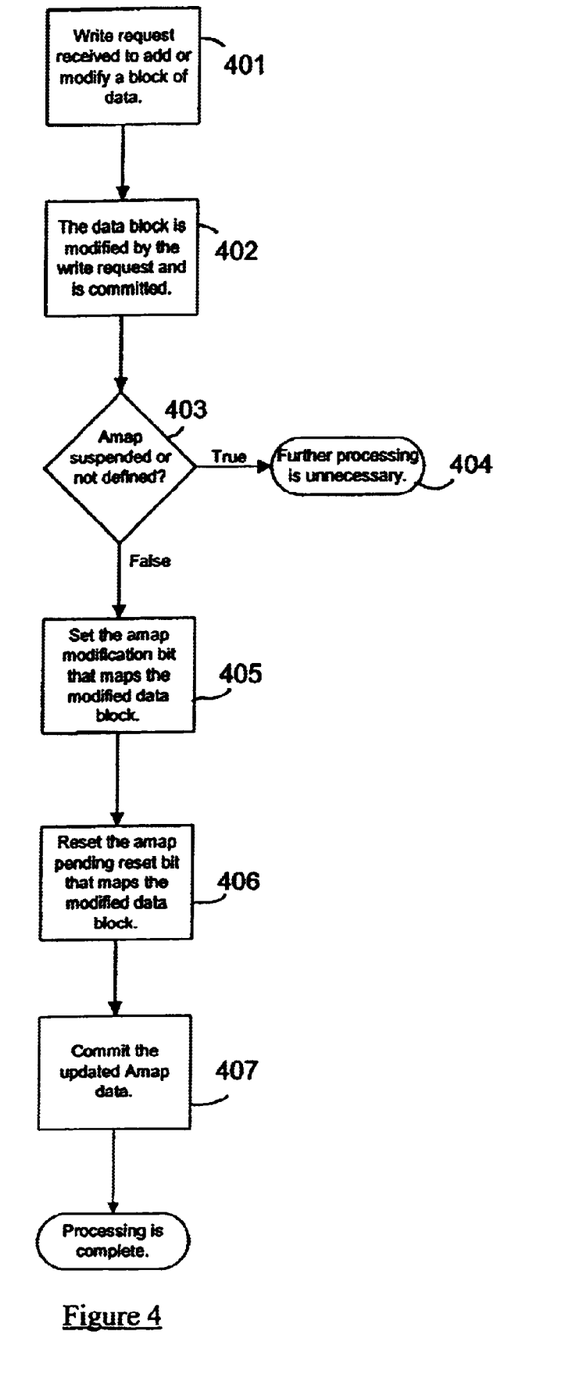
FIG. 4 is a flow chart showing a preferred embodiment of the process for updating the Amap for a single block WRITE request, according to the invention.
Figure 6:
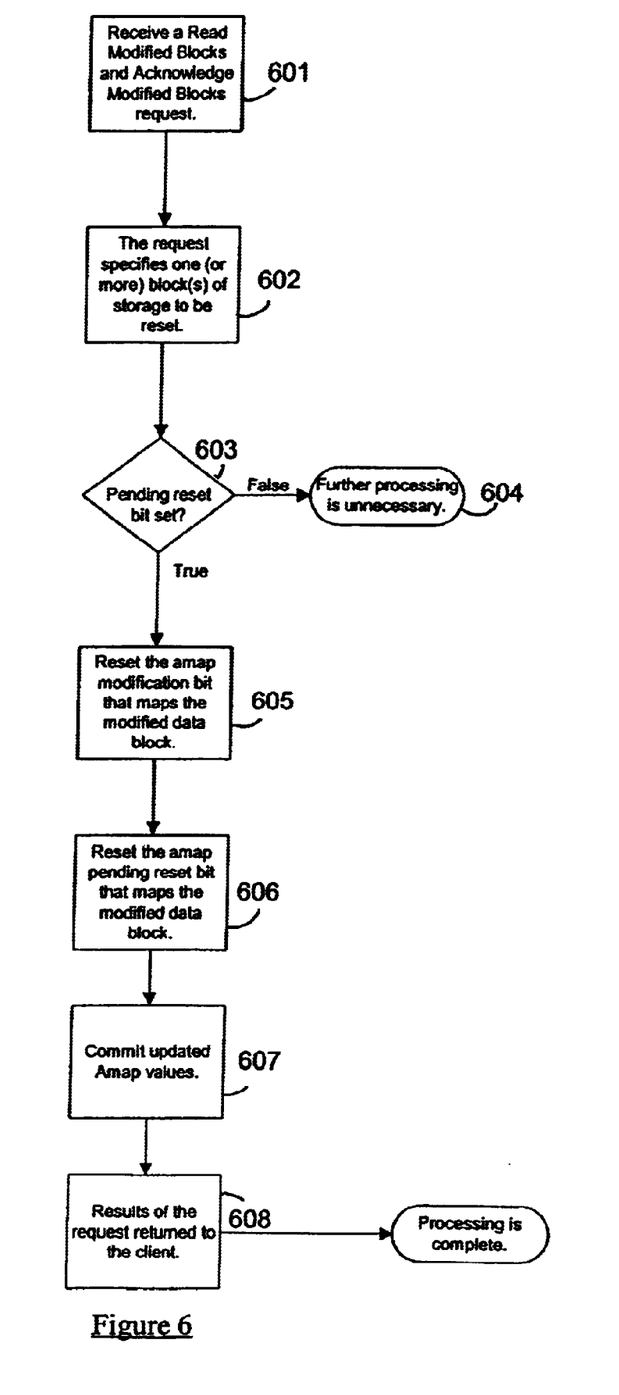
FIG. 6 is a flow chart showing a preferred embodiment of the process for resetting the Amap of a modified data block, according to the invention.

The Amap 203 is a bit array in which two bits 204 and 205 are allocated for each block 206 of storage that may be assigned to hold client data. Collectively, the bits 204 and 205 are known as the Altered Block Bit pair. Bit 204 of the pair is called the Modification Bit and is set whenever the associated data block is modified by a write. The process for updating the Modification Bit 204 when the block is modified is described below in reference to FIG. 4. The other bit (205) is referred to as a Pending Reset Bit and is set as the result of a client request. FIG. 6 illustrates how the Pending Reset Bit 205 gets set for a block when a client sends the data for that modified block. FIG. 4 illustrates how the Pending Reset Bit 205 is reset as the result of a WRITE request.

FIG. 2 additionally shows an Altered Block Counter 208 and a Modification Counter 209 on the storage device 201. These counters help the clients 102 quickly recognize the data on the storage device that has been modified. A particular embodiment of the invention may implement either or both of the counters. The Altered Block Counter 208 is particularly useful when it accompanies the Amap 203. It is incremented whenever a previously unmodified data block is modified. A block that was previously modified will have the Modification Bit 204 already on. If the Modification Bit 204 is not set, then the Altered Block Counter 208 is incremented, otherwise (i.e. the bit is already set) the Altered Block Counter 208 remains unchanged. This counter is decremented whenever a data block that has a Pending Reset Bit set gets reset (i.e. has the Modification Bit and Pending Reset Bit both cleared as the result of an ACKNOWLEDGE MODIFIED BLOCKS request).

The Modification Counter 209 allows the clients 102 to recognize whether data has been modified over a given interval of time. Typically, a client 102 would interrogate the value of the Modification Counter 209 and then does this again at some later time. If the two values match, no data was modified during the interval. The request processor 103 increments the Modification Counter 209 whenever a modified data block is committed to persistent storage. Preferably, the Modification Counter 209 is a wrapping monotonically increasing persistent counter.

While the Altered Block Counter 208 and Modification Counter 209 are optional features, their presence allows for faster and more efficient recognition and processing of modified data from the storage device 101. A typical preferred embodiment of the invention may include just one Modification Counter 209 but multiple Altered Block Counters 208, one for each Amap 203. An Altered Block Counter is needed for each Amap 203 because different applications may be tracking data modification over different intervals of time using different Amaps.

A WRITE request can cause a change in the value of the bits that map a given data block for each modification map. A WRITE to a given data block will cause the value of the Toggle Bit 207 of the Tmap 202 that maps that block to toggle (i.e. the value of the bit is inverted). Further, a WRITE request to a given data block can cause the Amap 203 bit values to change. A WRITE request causes the Modification Bit 204 to be set if it was not already set and causes the Pending Reset Bit 205 to be cleared if that bit was previously set. Additionally, a write can cause some optional Block Counters 208 and 209 to be incremented.

To process a WRITE request that modifies a data block, the request processor 103 first updates or replaces the content of the data block with client-supplied data. It then commits the modified data by taking the following actions:
storing the modified data block to persistent storage 104,
incrementing the persistent Modification Counter,
updating any block modification maps and the associated counters to indicate that the block that was modified, and
storing the updated maps to persistent storage.

The data commit ensures that the last three actions above occur atomically (from the prospective of an outside observer, as a single indivisible action that occurs completely or not all). The invention can accomplish this atomicity by the use of a log or other means of persistent storage that can aggregate the actions into a single related transaction.

The request processor 103 processes client requests that allow data on the storage device 101 to be examined and modified. It also allows designated clients to examine any data that has been modified over a given interval of time. Three requests facilitate clients examining information about whether data on the storage device was modified: READ MODIFIED BLOCKS request, ACKNOWLEDGE MODIFIED BLOCKS request and OBTAIN TOGGLE MAP STATE request. The READ MODIFIED BLOCKS request and the ACKNOWLEDGE MODIFIED BLOCKS request cause the Amap 203 values for modified data blocks to be modified under certain conditions. The OBTAIN TOGGLE MAP STATE request simply allows values in the Tmap 202 to be examined.

The READ MODIFIED BLOCKS request allows a client to obtain the location and contents of one or more modified data blocks. In a preferred embodiment of the invention the request may specify the maximum number of modified blocks that may be returned as a result of the request. The ACKNOWLEDGE MODIFIED BLOCKS request provides a mechanism to let the client acknowledge that it successfully received the modified blocks returned to it as a result of a previous read modified block request. In a preferred embodiment of the invention the READ MODIFIED BLOCKS request and the ACKNOWLEDGE MODIFIED BLOCKS request may be combined into a single request so that blocks successfully processed in a previous request may be acknowledged while at the same time requesting additional modified blocks be returned if any remain. The OBTAIN TOGGLE MAP STATE request allows a client to obtain the toggle map value for one or more specified blocks.

Figure 3:
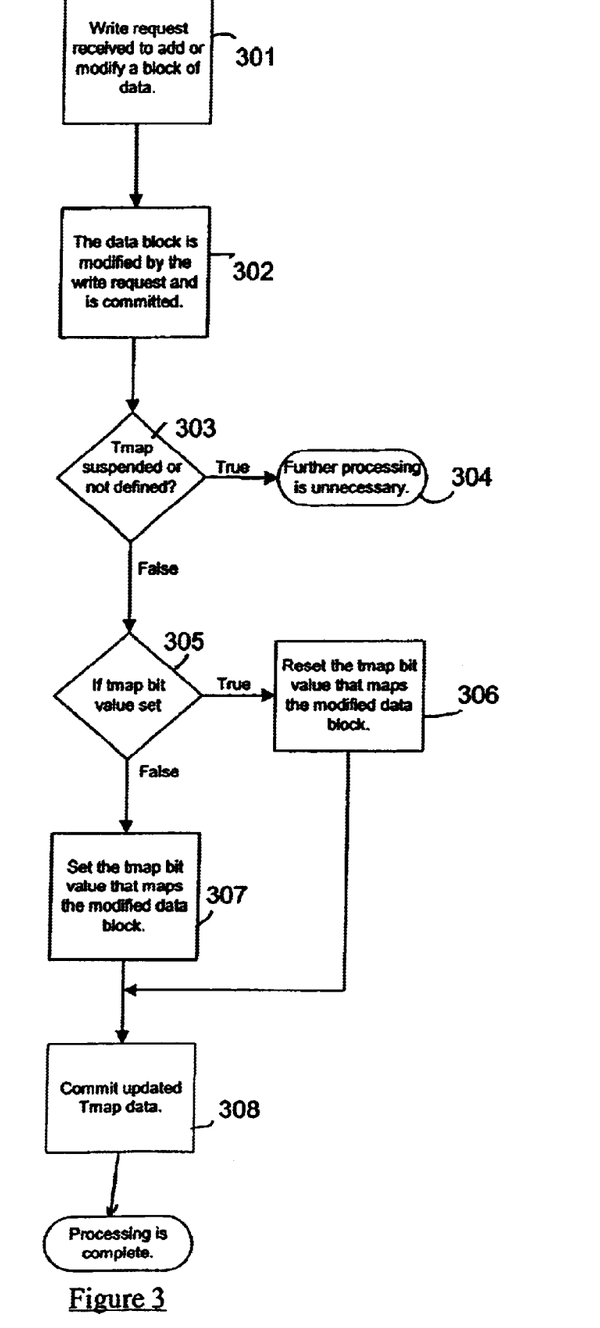
FIG. 3 is a flow chart showing a preferred embodiment of the process for updating the Tmap for a single block WRITE request, according to the invention.

FIG. 3 illustrates how the Tmap 202 and its toggle bit 207 can be used in conjunction with the OBTAIN TOGGLE MAP STATE request to determine if a WRITE request successfully completed. FIG. 3 details the processing of how the Toggle Map (Tmap) bits are processed. When the request processor 103 processes a WRITE request in step 301, the data block content is modified (or replaced) and the result is committed in step 302. Additionally, if an Tmap 202 is defined and processing for that Tmap is not suspended (step 303), then the Tmap bit that maps the data block being modified is checked and toggled in step 305. If the value was set, then it is reset in step 306. If the value was not set, then it becomes set in step 307. If processing on the Tmap is suspended, then no further actions are necessary in step 304. The updated Tmap value is committed in step 308, completing the update of the data block. From the perspective of the client that sent the WRITE request 301, the steps 301–308 appear as an atomic transaction meaning that steps 302 and 308 are either completed or not completed together.

Table 1 illustrates a Tmap 202 for a storage device with eight blocks available for assignment by clients. The Tmap 202 bits 0 through 7 are used to map the eight data blocks on the storage device 101. These are the Tmap 202 bits for the data blocks on the storage device. The value of the Modification Counter 209 is also shown in the table. Each row in the table represents gives the contents of the Tmap 202 after the operation specified in the column Operation Performed has been performed. Note that the preferred embodiment of the invention illustrated is one that allows multiple blocks (even blocks that are not logically adjacent) to be modified in a single WRITE request.

TABLE 1

| Tmap: Blocks 0–7 Bits 0–3 | Bits 4–7 | Modification Counter | Operation Performed |
|---|---|---|---|
| 0000 | 0000 | 0 | Tmap defined and device initialized |
| 1000 | 0000 | 1 | Tmap content after a write to block 0 |

TABLE 1-continued

| Tmap: Blocks 0–7 Bits 0–3 | Bits 4–7 | Modification Counter | Operation Performed |
|---|---|---|---|
| 1010 | 0000 | 2 | Tmap content after write to block 2 |
| 1010 | 1001 | 3 | Tmap content after writes to block 4 and 7 |
| 0010 | 1001 | 4 | Tmap content after write to block 0 |
| 1010 | 0001 | 5 | Tmap content after writes to block 0 and 4 |

FIG. 4 illustrates a WRITE request being processed by the request processor 103 that results in the Amap 203 being updated. The WRITE request to modify a data block is received in step 401 and the data block content is modified (or replaced) and the result is committed. If an Amap 203 is defined and processing for that Amap is not suspended 403 then the Amap's Modification Bit is set (step 405) and the Pending Reset Bit is reset for the Amap entry that maps that data block (step 406). If processing on the Amap 203 is suspended then no further actions are necessary (step 404). The updated Amap 203 value is next committed (step 407), completing the update of the data block. From the perspective of the client that sent the WRITE request (step 401), the steps 401–407 appear as an atomic transaction meaning that steps 402 and 407 are both either completed or not completed.

Figure 5:
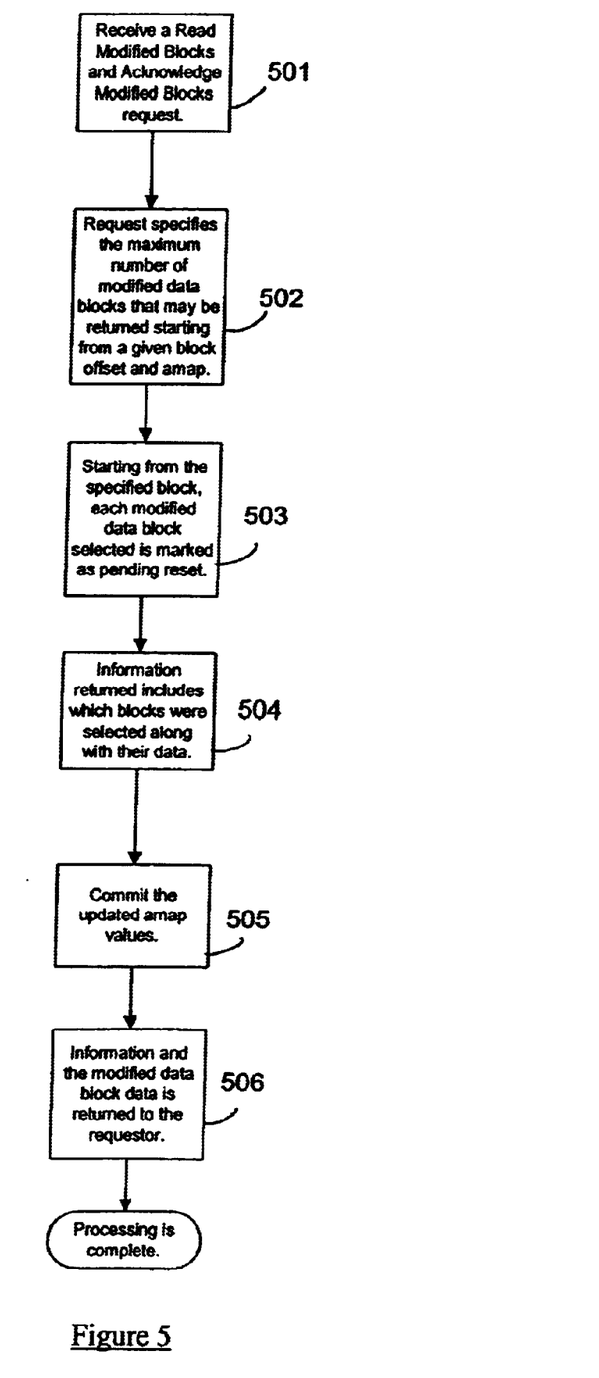
FIG. 5 is a flow chart showing a preferred embodiment of the process for selecting modified data blocks for processing, according to the invention.

FIG. 5 illustrates the processing related to a READ MODIFIED BLOCKS request. The illustration represents a preferred embodiment of the invention where the request processor 103 receives a combined request to READ MODIFIED BLOCKS and to ACKNOWLEDGE MODIFIED BLOCKS (from a previous request) in step 501. The processing described focuses on how the READ MODIFIED BLOCKS portion of the request is processed. The request specifies the Amap 203 the request is against and a starting offset in the Amap 203 to begin the search as well as a maximum block count to be returned for modified blocks (step 502). The request processor 103 finds the next modified block (the next block that has it's Modification Bit set). It sets the Pending Reset Bit of the Amap for that block in step 503 and prepares to return the contents of the modified data block to the request processor in step 504. The updated Amap value is committed (step 505) and the modified data block information along with their location on the device and a count of blocks being returned is sent back to the requesting client (step 506).

FIG. 6 illustrates how an ACKNOWLEDGE MODIFIED BLOCKS request provides a mechanism to let the client acknowledge that it received and processed data blocks returned to it from a previous READ MODIFIED BLOCKS request. The illustration represents a preferred embodiment of the invention where the request processor 103 receives a combined request to READ MODIFIED BLOCKS and to ACKNOWLEDGE MODIFIED BLOCKS (from a previous request) in step 601. The processing described focuses on how the ACKNOWLEDGE MODIFIED BLOCKS portion of the request is processed. In this illustration, the request specifies one (or more) data block that was returned to the client from a previous READ MODIFIED BLOCKS request and was successfully processed by the client (step 602). The client is informing the request processor 103 that from the perspective of the client, the client believes it has examined the most up to date content for this data block. In reality, this may not be the case if the data block was further modified. The request processor 103 checks the Pending Reset Bit 205 of the Amap that maps this data block in step 603. If the Pending Reset Bit is set the block has not been further modified so the acknowledge modified block request for that block is successful. A successful acknowledge modified block request for a block results in the Amap's Modification Bit 204 to be reset in step 605, along with the Amap 203's Pending Reset Bit 205 being reset in step 606. The updated Amap value is committed in step 607 and the result of the request is returned to the client in step 608. If the Amap's Pending Reset Bit for the data block is not set (step 603), then no further processing is needed (step 604). This results in the client receiving a result that their acknowledge modified block request failed (informing them that the data block has been further modified).

It is important to note that if a WRITE to given data block intervenes between READ MODIFIED BLOCKS request that set the Pending Reset Bit for that block and the ACKNOWLEDGE MODIFIED BLOCKS request for the block fails, so the Modification Bit for that block remains set. This is critical to maintaining the correct state of modified data blocks as the block in question has been further modified.

The Altered Block Counter if present is also affected by reset processing. Again, the Altered Block Counter is incremented whenever a data block that does not have its Modification Bit set has that bit set (i.e. a WRITE request modifies the block). The Altered Block Counter is decremented when ever a data block that has a set Pending Reset Bit gets reset (i.e. due to an ACKNOWLEDGE MODIFIED BLOCKS request).

Table 2 illustrates a successful processing of the Amap. The example includes an Amap 203 for a storage device with eight blocks available for assignment by clients. The Amap bits 0 through 15 are used to map the storage device's eight data blocks. Two bits, a Modification Bit 204 and Pending Reset Bit 205 are used for each block mapped by the Amap 203. The values for the Altered Block Counter 208 and the Modification Counter 209 are also shown in the table. Each row in the table represents gives the contents of the Amap 203 after the operation specified in the column Operation Performed has been performed. Note that the preferred embodiment of the invention illustrated allows multiple blocks (even blocks that are not logically adjacent) to be modified in a single WRITE request. Note also that in a preferred embodiment of the invention the steps illustrated in the READ MODIFIED BLOCKS request and ACKNOWLEDGE MODIFIED BLOCKS request could be combined into a single request. However in Table 2, the two requests are separated for the sake of clarity.

TABLE 2

| Amap: Blocks 0–7 Bits 0–7, 8–15 | | | | Modification Counter | Operation Performed | Altered Block Counter |
|---|---|---|---|---|---|---|
| 0000 | 0000 | 0000 | 0000 | 0 | Amap defined and device initialized | 0 |
| 1000 | 0000 | 0000 | 0000 | 1 | Amap content after a write to block 0 | 1 |
| 1000 | 1000 | 0000 | 0000 | 2 | Amap content after write to block 2 | 2 |
| 1000 | 1000 | 1000 | 0010 | 3 | Amap content after writes to blocks 4 and 7 | 4 |
| 1100 | 1100 | 1000 | 0010 | 3 | Amap content after READ MODIFIED BLOCKS request - two blocks returned 0 and 2 | 4 |

TABLE 2-continued

| Amap: Blocks 0–7 Bits 0–7, 8–15 | | | | Modification Counter | Operation Performed | Altered Block Counter |
|---|---|---|---|---|---|---|
| 0000 | 0000 | 1000 | 0010 | 3 | Amap content after a successful ACKNOWLEDGE MODIFIED BLOCKS request for blocks 0 and 2. | 2 |
| 0000 | 0000 | 1100 | 0011 | 3 | Amap content after READ MODIFIED BLOCKS request - two blocks returned 4 and 7 | 2 |
| 0000 | 0010 | 1100 | 0011 | 4 | Amap content after write to block 3 | 3 |
| 0000 | 0010 | 0000 | 0000 | 4 | Amap content after ACKNOWLEDGE MODIFIED BLOCKS request for block 4 and 7. | 1 |

Table 3 illustrates the processing of an Amap 203 with an intervening WRITE occurring between a READ MODIFIED BLOCKS request and a subsequent ACKNOWLEDGE MODIFIED BLOCKS request. Again, the Amap 203 has eight entries mapping the hypothetical eight blocks on the storage device, where two bits are assigned for each entry: one Modification Bit 204 and one Pending Reset Bit 205. Each row in the table represents gives the contents of the Amap 203 after the operation specified in the column Operation Performed has been performed. The same comments about the preferred embodiments mentioned for Table 2 apply. The difference in this example is that intervening WRITE occurs just prior to the final acknowledge modify blocks request occurring. This negates the reset for block four as that block has been further altered since the block was marked for reset. The intervening WRITE cleared the Pending Reset Bit so the block is easily recognized as being altered and so it remains marked as modified. The Altered Block Counter is also not decremented since the block is still modified.

TABLE 3

| Amap: Blocks 0–7 Bits 0–7, 8–15 | | | | Modification Counter | Operation Performed | Altered Block Counter |
|---|---|---|---|---|---|---|
| 0000 | 0000 | 0000 | 0000 | 0 | Amap defined and device initialized | 0 |
| 1000 | 0000 | 0000 | 0000 | 1 | Amap content after a write to block 0 | 1 |
| | | | | 2 | Amap content after a write to block 2 | 2 |
| 1000 | 1000 | 1000 | 0010 | 3 | Amap content after writes to blocks 4 and 7 | 4 |
| 1100 | 1100 | 1000 | 0010 | 3 | Amap content after READ MODIFIED BLOCKS request - two blocks returned 0 and 2 | 4 |
| 0000 | 0000 | 1000 | 0010 | 3 | Amap content after a successful ACKNOWLEDGE MODIFIED BLOCKS request for blocks 0 and 2. | 2 |
| 0000 | 0000 | 1100 | 0011 | 3 | Amap content after READ MODIFIED BLOCKS request - two blocks returned 4 and 7 | 2 |
| 0000 | 0010 | 1000 | 0011 | 4 | Amap after blocks 3 and 4 are modified | 3 |
| 0000 | 0010 | 1000 | 0000 | 4 | Amap content after ACKNOWLEDGE MODIFIED BLOCKS request for block 4 and 7. Note that block 3 was further modified so it is sill marked modified. | 2 |

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A storage system for providing data consistency to multiple clients, comprising:

a facility for storing data and data modification information, wherein the data is stored as data blocks; and a request processor for handling requests for data from the clients, said request processor capable of identifying data that has been modified during a given time interval based on the modification information and updating the modification information to ensure that the data accessed by the clients will be consistent, wherein the data modification information includes an Altered Block Map and a Toggle Block Map, the Altered Block Map indicating the modification status of the data blocks and the Toggle Block Map indicating which data blocks have been modified, wherein the Toggle Block Map includes a plurality of bits, each bit corresponding to a data block and said bit complemented when the data block is modified.

2. The system as in claim 1 wherein:

the Altered Block Map includes a plurality of bits, each pair of bits in the Altered Block Map corresponding to a data block and including a Modification Bit and a Pending Reset Bit;

the Modification Bit is set whenever the data block is modified by a write request; and the Pending Reset Bit is set whenever the data block is requested by a client.

3. The system as in claim 2 wherein the Modification Bit and the Pending Reset Bit may be reset by a request from one of the clients to the request processor.

4. The system as in claim 3 wherein, if the data block is further modified after the respective Pending Reset Bit has been set, then the Pending Reset Bit is reset while the Modification Bit remains set.

5. The system as in claim 3 further comprising an Altered Block Counter for indicating the number of data blocks that have been modified, the Altered Block Counter being incremented whenever one of the data blocks is modified.

6. The system as in claim 5 wherein if the Modification Bit is reset while the Pending Reset Bit is still on, then:

the Altered Block Counter is decremented; and the Pending Reset Bit is reset.

7. The system as in claim 1 further comprising a set of application programs wherein:

the clients access the data blocks through the application programs; and the application programs communicate with the request processor to access the desired data blocks and to update the modification information.

8. The system as in claim 1 further comprising a Modification Counter, said Modification Counter being incremented every time one of the data blocks is committed as a result of a client request.

9. In a storage system including a facility for storing data and data modification information and a request processor for handling requests for data from clients, a method for providing data consistency comprising the steps of:

identifying data that has been modified during a given time interval based on the modification information, wherein the data is stored as data blocks, wherein the data modification information includes an Altered Block Map and a Toggle Block Map, the Altered Block Map indicating the modification status of the data blocks and the Toggle Block Map indicating which data blocks have been modified, wherein the Toggle Block Map includes a plurality of bits, each bit corresponding to a data block and said bit complemented when the data block is modified;

accessing the modified data; and updating the modification information to ensure that data accessed by the clients will be consistent.

10. The method as in claim 9 wherein:

the Altered Block Map includes a plurality of bits, each pair of bits in the Altered Block Map corresponding to a data block and including a Modification Bit and a Pending Reset Bit;

the method further comprising the steps of:

setting the Modification Bit whenever the data block is modified by a write request; and setting the Pending Reset Bit whenever the data block is requested by a client.

11. The method as in claim 10 further comprising the step of resetting Modification Bit and the Pending Reset Bit upon a request from one of the clients to the request processor.

12. The method as in claim 11 further comprising the step of resetting the Pending Reset Bit associated with the data block if the data block is further modified after the respective Pending Reset Bit has been set and while the Modification Bit remains set.

13. The method as in claim 11 wherein:

the storage system further includes an Altered Block Counter for indicating the number of data blocks that have been modified; and the method further comprises the step of incrementing the Altered Block Counter whenever one of the data blocks is modified.

14. The method as in claim 13 further comprising the step of decrementing the Altered Block Counter whenever the Modification Bit is reset.

15. The method as in claim 14 further comprising the steps of decrementing the Altered Block Counter and resetting the Pending Reset Bit whenever the Modification Bit is reset while the Pending Reset Bit is still on.

16. The method as in claim 9 wherein:

the clients access the data blocks through a set of application programs; and the application programs communicate with the request processor to access the desired data blocks and to update the modification information.

17. A computer-program product for use with a storage system including a facility for storing data and data modification information and a request processor for handling requests for data from clients, the computer-program product comprising:

a computer-readable medium;

means, provided on the computer-readable medium, for identifying data that has been modified during a given time interval based on the modification information, wherein the data is stored as data blocks, wherein the data modification information includes an Altered Block Map and a Toggle Block Map, the Altered Block Map indicating the modification status of the data blocks and the Toggle Block Map indicating which data blocks have been modified, wherein the Toggle Block Map includes a plurality of bits, each bit corresponding to a data block and said bit complemented when the data block is modified;

means, provided on the computer-readable medium, accessing the modified data; and means, provided on the computer-readable medium, for updating the modification information to ensure that data accessed by the clients will be consistent.

18. The computer-program product as in claim 17 wherein:

the Altered Block Map includes a plurality of bits, each pair of bits in the Altered Block Map corresponding to a data block and including a Modification Bit and a Pending Reset Bit; and the computer-program product further comprises:

means, provided on the computer-readable medium, for setting the Modification Bit whenever the data block is modified by a WRITE request; and means, provided on the computer-readable medium, for setting the Pending Reset Bit whenever the data lock is requested by a client.

19. The computer-program product as in claim 18 further comprising means, provided on the computer-readable medium, for resetting the Modification Bit and the Pending Reset Bit upon a request from one of the clients to the request processor.

20. The computer-program product as in claim 19 further comprising means, provided on the computer-readable medium, for resetting the Pending Reset Bit associated with the data block if the data block is further modified after the respective Pending Reset Bit has been set and while the Modification Bit remains set.

21. The computer-program product as in claim 19 wherein:

the storage system further includes an Altered Block Counter for indicating the number of data blocks that have been modified; and the computer-program product further comprises means, provided on the computer-readable medium, for incrementing the Altered Block Counter whenever one of the data blocks is modified.

22. The computer-program product as in claim 21 further comprising means, provided on the computer-readable medium, for decrementing the Altered Block Counter whenever the Modification Bit is reset.

23. The computer-program product as in claim 22 further comprising means, provided on the computer-readable medium, for decrementing the Altered Block Counter and means, provided on the computer-readable medium, for resetting the Pending Reset Bit whenever the Modification Bit is reset while the Pending Reset Bit is still on.

24. The computer-program product as in claim 17 further comprising:

means, provided on the computer-readable medium, for the clients to access the data blocks through a set of application programs; and means, provided on the computer-readable medium, for the application programs to communicate with the request processor to access the desired data blocks and to update the modification information.

25. A storage system for providing data consistency to multiple clients, comprising:

a facility for storing data and data modification information, wherein the data is stored as data blocks; and a request processor for handling requests for data from the clients, said request processor capable of identifying data that has been modified during a given time interval based on the modification information and updating the modification information to ensure that the data accessed by the clients will be consistent, wherein the data modification information includes an Altered Block Map, and a Toggle Block Map, the Altered Block Map indicating the modification status of the data blocks and the Toggle Block Map indicating which data blocks have been modified, wherein the Altered Block Map includes a plurality of bits, each pair of bits in the Altered Block Map corresponding to a data block and including a Modification Bit and a Pending Reset Bit, the Modification Bit is set whenever the data block is modified by a write request, and the Pending Reset Bit is set whenever the data block is requested by a client.

26. In a storage system including a facility for storing data and data modification information and a request processor for handling requests for data from clients, a method for providing data consistency comprising the steps of:

identifying data that has been modified during a given time interval based on the modification information, wherein the data is stored as data blocks, wherein the data modification information includes an Altered Block Map and a Toggle Block Map, the Altered Block Map indicating the modification status of the data blocks and the Toggle Block Map indicating which data blocks have been modified, wherein the Altered Block Map includes a plurality of bits, each pair of bits in the Altered Block Map corresponding to a data block and including a Modification Bit and a Pending Reset Bit, wherein the Modification Bit is set whenever the data block is modified by a WRITE request and the Pending Reset Bit is set whenever the data block is requested by a client;

accessing the modified data; and updating the modification information to ensure that data accessed by the clients will be consistent.

27. A computer-program product for use with a storage system including a facility for storing data and data modification information and a request processor for handling requests for data from clients, the computer-program product comprising:

a computer-readable medium;

means, provided on the computer-readable medium, for identifying data that has been modified during a given time interval based on the modification information, wherein the data is stored as data blocks, wherein the data modification information includes an Altered Block Map and a Toggle Block Map, the Altered Block Map indicating the modification status of the data blocks and the Toggle Block Map indicating which data blocks have been modified, wherein the Altered block Map includes a plurality of bits, each pair of bits in the Altered Block Map corresponding to a data block and including a Modification Bit and a Pending Reset Bit, wherein means are provided on the computer-readable medium, for setting the Modification Bit whenever the data block is modified by a WRITE request, and means are provided on the computer-readable medium, for setting the Pending Reset Bit whenever the data block is requested by a client;

means, provided on the computer-readable medium, accessing the modified data; and means, provided on the computer-readable medium, for updating the modification information to ensure that data accessed by the clients will be consistent.

* * * * *